UNITED STATES PATENT OFFICE.

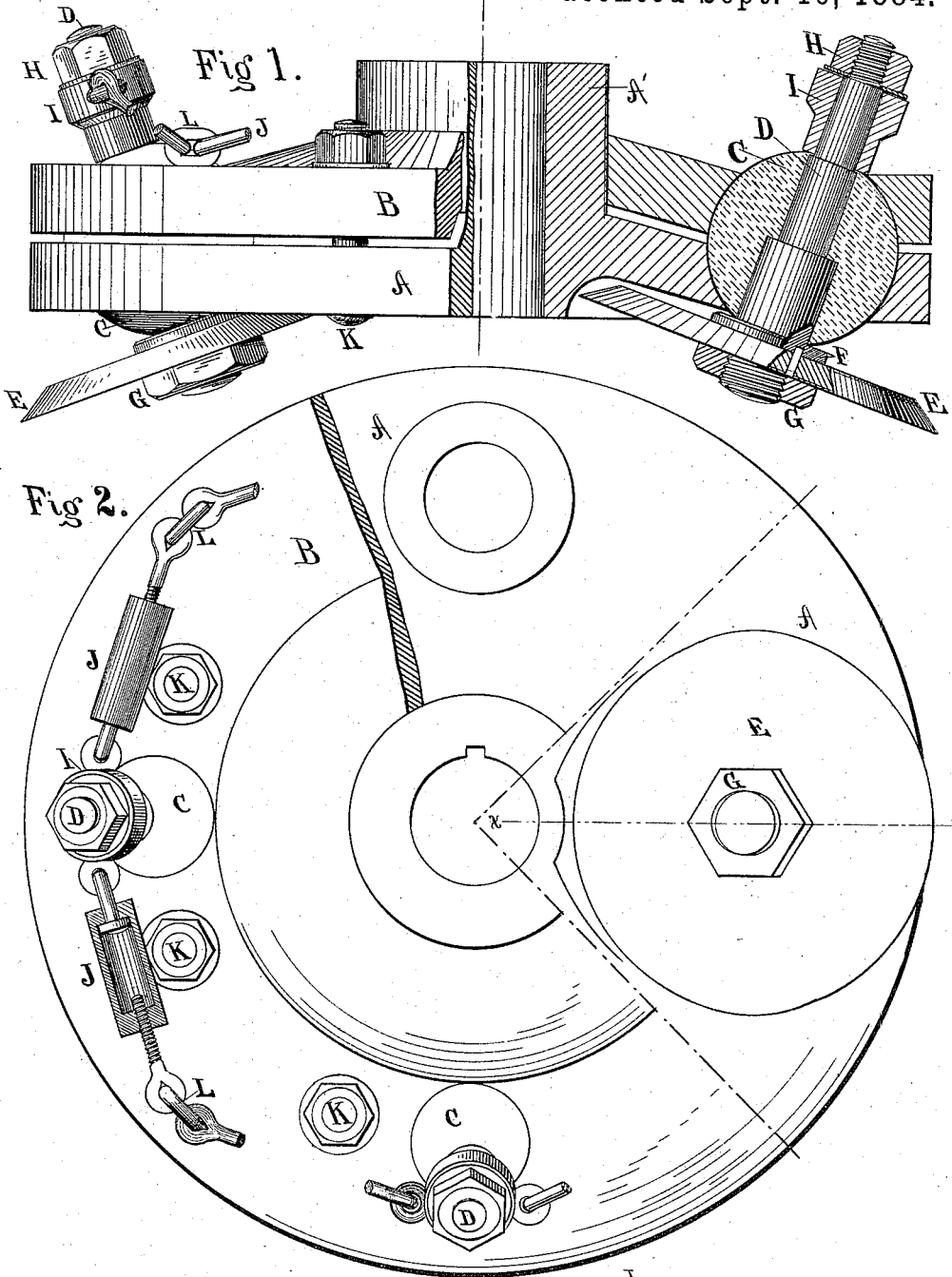

DAVIS TILLSON, OF ROCKLAND, MAINE.

STONE-CUTTING MACHINE.

SPECIFICATION forming part of Letters Patent No. 305,409, dated September 16, 1884.

Application filed May 10, 1884. (No model.)

*To all whom it may concern:*

Be it known that I, DAVIS TILLSON, of Rockland, in the county of Knox and State of Maine, have invented a new and useful Improvement in Stone-Cutting Machines; and I do hereby declare that the following is a full, clear, and exact description of the same.

My invention relates to machinery for dressing stone of that class in which revolving disks are carried over the stone at an angle to the surface thereof.

The invention consists of special mechanism for holding the cutting-disks, whereby they are conveniently held, and may be set at any desired angle to the surface of the stone. The details of construction are set forth hereinafter, and are shown in the accompanying drawings, in which—

Figure 1 represents the apparatus fully in side elevation and partly in section. Fig. 2 is a plan view, with a part of the upper disk broken away.

A disk, A, preferably of cast-iron, has a hub, A', fitted to a shaft suitable for driving the mechanism. Over the hub is fitted another disk, B, of equal diameter with A. At suitable points—for example, at four points equidistant from each other and near the circumference—are concavities in the disks, accurately registering, and fitted to hold the iron balls C when the disks are clamped together. The balls are bored to receive the shouldered bolts D, (or these may be conical,) which are provided with the nuts H, whereby the bolts may be held in the balls, but not so as to prevent the rotation of said shafts therein. The lower end of the bolts have heads F, and the cutting-disk is slipped on and keyed to the head, as shown. A nut, G, is then screwed on, and the disk held rigidly to the shaft.

The disks A B are held by bolts K, which may be made to clamp the disks with any desired force, but the balls may be turned to bring the cutting-disks E to any required angle to the face of the stone to be dressed. As shown, these disks are tipped outward, and the outer edge comes into contact with the stone. The disks A may be formed with cavities to receive the inner edge, as shown in Fig. 1, in order to give greater inclination to the cutting-disks. The force exerted upon the cutting-disks, whenever at work, being in a horizontal plane between the cutting-edges and the line where the disks are secured to their bars, tends to tip them farther in the direction in which they are inclined in the figures. In order to hold them accurately to their work, I have provided swiveled links, as shown in Fig. 2. On the end of each bolt D, between the edge of the ball C and its nut H, is set a ring or sleeve, I, having eyes which are connected by links provided with turn-buckles J to eyebolts L, set in the disk B. The position is clearly shown in Fig. 2, by means of which position the links hold the bolts and cutting-disks against lateral or radial strain, and, as the sleeves I are loose on the bolts D, do not interfere with or prevent the rotation thereof. Between the sleeves I and nuts H washers are placed. The angle of the cutting-disk may be varied by means of the turn-buckle J. Revolution of the disks A and B causes the cutters to travel in a circular path, and the stone is preferably fed under them to present fresh surface to the work.

I claim—

1. In combination, a pair of disks suitably connected to a shaft and to each other, balls held in suitable cavities in their disks, and cutting-disks pivoted in said balls, all substantially as described.

2. In combination, the disk A, the disk B, connected thereto, the balls between said disks, the bolts carrying the cutting-disks fitted to said balls, and devices, substantially as described, for adjusting the balls, substantially as described.

3. The disk A, having a hub, A', and disk B, secured thereto, both having cavities, the ball C, fitted thereto, combined with bolt D, carrying cutting-disk E, all substantially as described.

4. In combination, the disk A, the disk B, connected thereto, the balls C, held between the disks A and B, as described, the bolts D, carrying the cutting-disks, and having sleeves I, and the links and turn-buckles J, connecting the sleeve I to the eyebolts, the parts being constructed and arranged in substantially the manner set forth.

In testimony whereof I have signed my name to this specification in presence of two subscribing witnesses.

DAVIS TILLSON.

Witnesses:
D. B. CAMPBELL,
GEO. G. RAMBO.